Patented Dec. 15, 1925.

1,565,689

UNITED STATES PATENT OFFICE.

WILLIAM R. VAN SLYKE, OF EVELETH, MINNESOTA.

PROCESS OF TREATING ORES.

No Drawing.    Application filed March 7, 1921.  Serial No. 450,424.

*To all whom it may concern:*

Be it known that I, WILLIAM R. VAN SLYKE, a citizen of the United States, residing at Eveleth, in the county of St. Louis and State of Minnesota, have invented certain new and useful Improved Processes of Treating Ores, of which the following is a specification.

My invention relates to the treatment of iron ores and more particularly to their preparation for reduction and subsequent smelting.

It is customary in the reduction of iron ores to use a fuel of sufficient strength to support the burden and having a porous structure to permit and facilitate the passage of reducing gases through the charge. At present coke and charcoal are the most satisfactory fuels fulfilling these requirements. The development of the iron industry has been substantially confined to areas where coking coal or coke is easily available. In certain districts fuels of a type other than coke or charcoal, for example, non-coking coals, lignite, peat, charcoal and oil are available and if these can be satisfactorily utilized as the fuel-medium, in addition to the advantages derived therefrom, the development of ore bodies, which are at present unavailable, due either to the grade of the ore body or the absence of or prohibitive cost of customary fuel such as coke or charcoal, will be greatly facilitated.

It is the object of my invention to permit the use of non-porous fuels, by treating the burden comprising the ore and flux or fluxes in such a manner as to produce therein a porous structure. This I accomplish by properly crushing the burden-constituents, either in whole or in part, mixing the same to a homogeneous mass, and thereafter sintering the same to produce a porous product.

The sintered product is then mixed with sufficient fuel to effect its reduction and the mixture charged to the blast furnace. Depending on the structure of the sinter and the fuel, it may be necessary to crush either or both before mixing and charging to the blast furnace, or the mixing of the sinter and fuel may be eliminated and each charged alternately to the furnace. The use of a sintered product having a porous structure gives the additional advantage that a sinter is produced that will pocket or occlude any finely divided fuel which may be used for reducing purposes. The sintering of the ore and flux either with or without preliminary crushing, results in a product which by its structure and analysis makes possible a considerable fuel economy whether coke, charcoal or other fuel is employed.

A specific example of my invention applied to the treatment of iron ores is as follows: The iron ore is preferably crushed to the required fineness and suitable flux or fluxes of requisite fineness added thereto, the ingredients being intimately mixed to a homogeneous mixture. The latter is then sintered to produce a porous mass of sufficient strength to withstand the pressure of superimposed successive charges fed to the furnace. The sintered material is thereafter, with or without crushing, preferably mixed with the fuel to insure proper contact of the fuel with the material to be reduced. This last mixing step may be dispensed with if desired, and the sintered product and fuel charged successively to the furnace.

The process, as broadly outlined, admits of many modifications, so long as the essential condition that enough sinter of iron ore and flux or fluxes be used to give the necessary porosity to the charge and permit the utilization of fuels other than porous ones such as coke or charcoal now in general use.

This process makes possible the use of non-coking coals which may be treated in a retort similar to coke manufacture, the volatile constituents being driven off. The resulting product is essentially a coke of poor structure and strength, but may be used with sinter on account of the porosity and strength supplied by the latter. So, too, woods and wood products which are not now used for the making of charcoal, but which could be made into charcoal of an inferior quality and used with my sinter or used without previous treatment, without having been turned into charcoal before use, may be employed.

The process may be varied so as to permit the use of a mixture of sintered and unsintered burden.

The production of a sintered product permits the use of substantially any form of carbonaceous material, for example, coals, both coking and non-coking, lignite, peat, sawdust, charcoal, residues of oil or other distillation processes, fuel oils, or powdered or gaseous fuels.

The terms "burden" and "charge" are to be given their customary significance. The burden consists of the ore and flux, being the amount of material that the fuel has to melt. The charge includes both the burden and the fuel.

What is claimed is,—

1. The process of treating iron ores comprising sintering the burden to produce a porous structure therein, adding a non-porous fuel thereto and smelting the charge to recover the iron-content.

2. The process of smelting iron ores which comprises sintering a portion at least of the burden to produce a porous structure therein, adding a fuel thereto normally incapable by reason of its physical structure of being used as a fuel medium in the process of smelting, and finally smelting the charge.

3. The process of smelting iron ores which comprises mixing the same with a flux or fluxes, sintering the mixture to produce a porous structure therein, adding a fuel thereto normally incapable by reason of its physical structure of being used as a fuel medium in the process of smeltering, and finally smelting the charge.

In testimony whereof I have signed my name to this specification.

WILLIAM R. VAN SLYKE.